US012579900B2

(12) United States Patent
Shoeb et al.

(10) Patent No.: US 12,579,900 B2
(45) Date of Patent: Mar. 17, 2026

(54) UAV PERCEPTION VALIDATION BASED UPON A SEMANTIC AGL ESTIMATE

(71) Applicant: WING AVIATION LLC, Mountain View, CA (US)

(72) Inventors: Ali Shoeb, San Rafael, CA (US); Kyle Krafka, Los Altos, CA (US)

(73) Assignee: Wing Aviation LLC, Palo Alto, CA (US)

( * ) Notice: Subject to any disclaimer, the term of this patent is extended or adjusted under 35 U.S.C. 154(b) by 282 days.

(21) Appl. No.: 18/535,929

(22) Filed: Dec. 11, 2023

(65) Prior Publication Data

US 2025/0191478 A1     Jun. 12, 2025

(51) Int. Cl.
| | |
|---|---|
| *G08G 5/74* | (2025.01) |
| *G06V 10/82* | (2022.01) |
| *G06V 20/56* | (2022.01) |
| *G08G 5/55* | (2025.01) |
| *G08G 5/57* | (2025.01) |

(52) U.S. Cl.
CPC .............. *G08G 5/74* (2025.01); *G06V 10/82* (2022.01); *G06V 20/56* (2022.01); *G08G 5/55* (2025.01); *G08G 5/57* (2025.01)

(58) Field of Classification Search
CPC .. G08G 5/74; G08G 5/55; G08G 5/57; G06V 10/82; G06V 20/56; G06V 20/13; G06N 3/044; G06N 3/045; G06N 3/08; G01C 5/00; G01C 11/04; G01C 21/1656; G01C 21/20
USPC .......................................................... 382/104
See application file for complete search history.

(56) References Cited

U.S. PATENT DOCUMENTS

| | | | |
|---|---|---|---|
| 10,304,208 B1 * | 5/2019 | Chandler | .............. G06F 3/0304 |
| 11,280,608 B1 * | 3/2022 | Zermas | .................. G01S 19/45 |
| 2023/0316741 A1 | 10/2023 | Shoeb et al. | |

OTHER PUBLICATIONS

Fei Liu, Jiayao Shan, Binyu Xiong and Zheng Fang; "A Real-Time and Multi-Sensor-Based Landing Area Recognition System for UAVs"; Published: May 7, 2022 (Year: 2022).*
Warren, Michael et al., "High Altitude Stereo Visual Odometry", Robotics: Science and Systems IX, Jun. 23, 2013, 8 pages.
Yang, Zhao et al., "A Real-Time Trajectory Prediction Method of Small-Scale Quadrotors Based on GPS Data and Neural Network", Sensors, vol. 20, No. 24, Dec. 10, 2020, 18 pages.
PCT International Search Report and Written Opinion mailed Dec. 18, 2024, in corresponding PCT Application No. PCT/US2024/049467, 14 pages.

(Continued)

*Primary Examiner* — Charlotte M Baker
(74) *Attorney, Agent, or Firm* — Christensen O'Connor Johnson Kindness PLLC

(57) ABSTRACT

A method for perception validation of an unmanned aerial vehicle (UAV) includes: acquiring an aerial image of a ground area with an onboard camera system of the UAV, generating a semantic above ground altitude (AGL) estimate with a neural network trained to output the semantic AGL estimate in response to the aerial image fed as an input to the neural network, generating a motion estimate or a position estimate based upon perception sensor data output from a perception sensor disposed onboard the UAV, and cross-validating the motion or position estimate against the semantic AGL estimate.

23 Claims, 7 Drawing Sheets

(56)　　　　　　　References Cited

OTHER PUBLICATIONS

GSP 216 Introduction to Remote Sensing, 'Aerial Photography', downloaded: <https://gsp.humboldt.edu/olm/Courses/GSP_216/lessons/air-photo.html> Oct. 2023 , 10 pages.

DIY Drones, 'Determining Altitude AGL Using Optical Flow—Blogs—diydrones', downloaded <https://diydrones.com/profiles/blogs/determining-altitude-agl-using-optical-flow> Oct. 2023, 3 pages.

Francisco-Javier Mesas-Carrascosa et al., Sensors Article: 'An Analysis of the Influence of Flight Parameters in the Generation of Unmanned Aerial Vehicle (UAV) Orthomosaicks to Survey Archaeological Areas', 2016, 16,1838; doi:10.3390/s16111838, Nov. 1, 2016, 14 pages.

Tomasz Kapuscinski et al., Sensors Article: 'A Vision-Based Method for Determining Aircraft State during Spin Recovery', Sensors 2020, 20, 2401; doi:10.3390/s20082401, Apr. 23, 2020, 17 pages.

* cited by examiner

UAV PERCEPTION VALIDATION BASED UPON A SEMANTIC AGL ESTIMATE

TECHNICAL FIELD

This disclosure relates generally to perception validation for aerial vehicles, and in particular but not exclusively, relates to estimating altitude above ground level (AGL) for unmanned aerial vehicles (UAVs).

BACKGROUND INFORMATION

An unmanned vehicle, which may also be referred to as an autonomous vehicle, is a vehicle capable of traveling without a physically present human operator. Various types of unmanned vehicles exist for various different environments. For instance, unmanned vehicles exist for operation in the air, on the ground, underwater, and in space. Unmanned vehicles also exist for hybrid operations in which multi-environment operation is possible. Unmanned vehicles may be provisioned to perform various different missions, including payload delivery, exploration/reconnaissance, imaging, public safety, surveillance, or otherwise. The mission definition will often dictate a type of specialized equipment and/or configuration of the unmanned vehicle.

Unmanned aerial vehicles (also referred to as drones) can be adapted for package delivery missions to provide an aerial delivery service. One type of unmanned aerial vehicle (UAV) is a vertical takeoff and landing (VTOL) UAV. VTOL UAVs are particularly well-suited for package delivery missions. The VTOL capability enables a UAV to takeoff and land within a small footprint thereby providing package pick-ups and deliveries almost anywhere. To safely deliver packages in a variety of environments (particularly environments of first impression), the UAV should be capable of accurately estimating its height above ground, commonly referred to as above ground altitude (AGL) to ensure it is maintaining safe operating margins from ground-based obstacles.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Embodiments of a system, apparatus, and method of operation for validating or cross-validating perception(s) of an unmanned aerial vehicle (UAV) are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments disclosed herein provide a technique to use a neural network trained to analyze aerial images acquired from an onboard camera system of a UAV and generate an above ground level (AGL) estimate. This AGL estimate output from the neural network is referred to herein as a semantic AGL estimate since the neural network is performing a semantic analysis of the aerial images to generate the AGL estimate. This semantic AGL estimate is then used as a basis for cross-validation with perception sensor data from other onboard perception sensors. For example, the semantic AGL estimate may be used to validate correct operation of a global navigation satellite system (GNSS) sensor, an inertial measurement unit (IMU) sensor, a stereovision depth sensor, a lidar sensor, a visual-inertial odometry (VIO) module, or otherwise. The AGL estimate not only provides a cross-validation mechanism (e.g., built-in self-test) for these other subsystems, but may also be combined (e.g., averaged) with secondary AGL estimates generated by these other perception sensors to improve the accuracy and reliability of the AGL estimate used by various subsystems of the UAV. For example, semantic segmentation can use distance estimates to objects in the aerial images to improve object identification by knowing in advance how large known objects should appear in the aerial images. Reliable semantic segmentation and AGL estimates themselves improve the navigation decisions made by the onboard navigation subsystems of the UAV. Having a reliable AGL estimate readily available to a UAV helps avoid close encounters, or even collisions, with ground-based obstacles.

Figure 1:
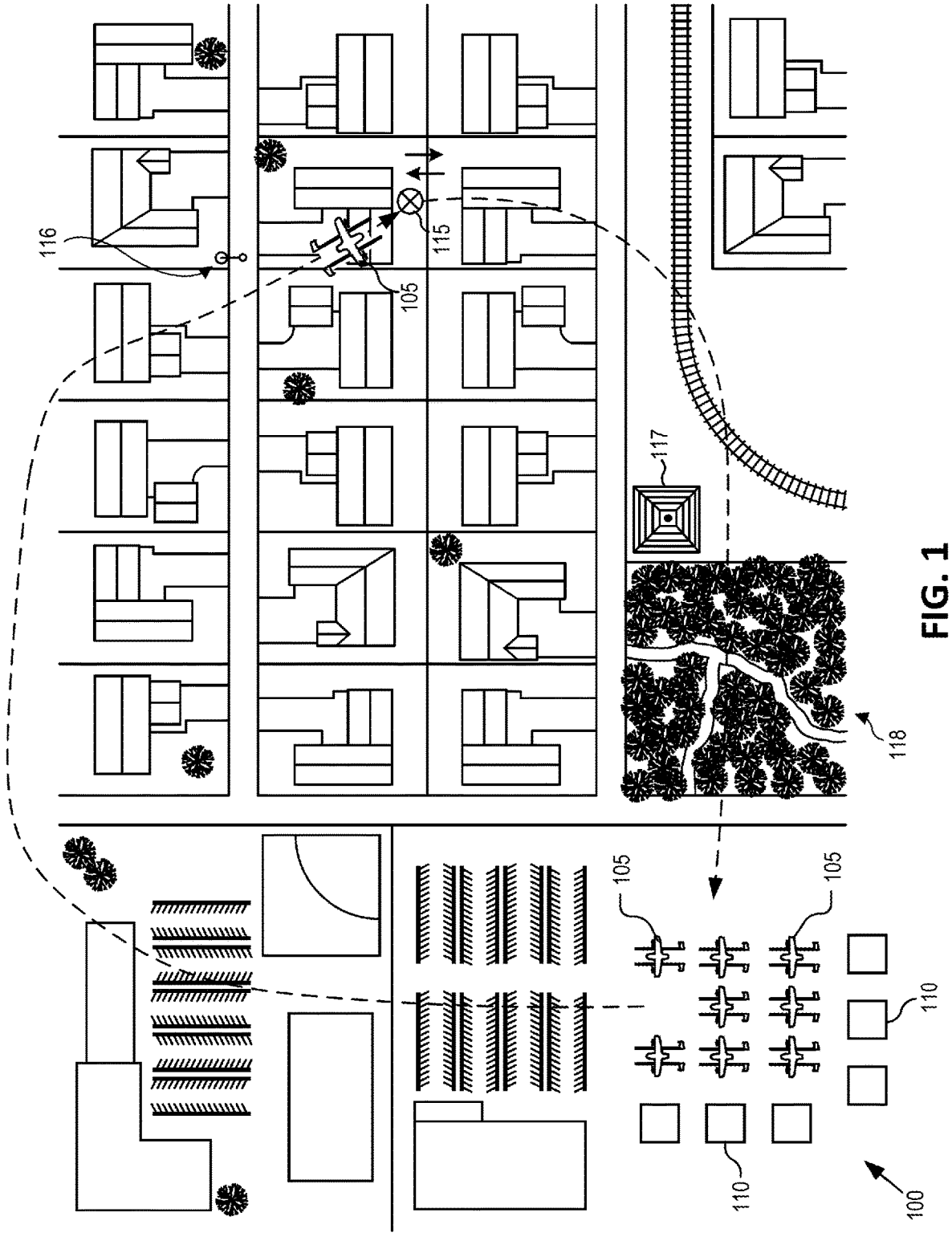
FIG. 1 illustrates operation of an unmanned aerial vehicle (UAV) delivery service that delivers packages into a neighborhood, in accordance with an embodiment of the disclosure.

FIG. 1 illustrates operation of a UAV delivery service that delivers packages into a neighborhood, in accordance with an embodiment of the disclosure. UAVs may one day routinely deliver items into urban or suburban neighborhoods from small regional or neighborhood hubs such as terminal area 100 (also referred to as a local nest or staging area). Vendor facilities that wish to take advantage of the aerial delivery service may set up adjacent to terminal area 100 (such as vendor facilities 110) or be dispersed throughout the neighborhood for waypoint package pickups (not illustrated). An example aerial delivery mission may include a UAV 105 taking off from terminal area 100 with a package for delivery to a destination area 115 (also referred to as a delivery zone or drop zone), rising to a cruising altitude, and cruising to the customer destination. At destination area 115, UAV 105 descends for package drop-off before once again ascending to a cruise altitude for the return journey back to terminal area 100.

During the course of a delivery mission, ground-based obstacles may be an ever present hazard—particularly tall slender obstacles such as streetlights 116, telephone poles, radio towers 117, cranes, trees 118, etc. Some of these obstacles may be persistent unchanging obstacles (e.g., streetlights, telephone poles, radio towers, etc.) while others may be temporary (cranes, etc.), or ever changing/growing (e.g., trees). Regardless, a reliable estimate of the UAV's AGL along with accurate identification of these obstacles is important for safe UAV navigation. These ground-based obstacles may be tall enough to present a hazard during cruise flight segments enroute to-and-fro destination 115 or present an acute hazard when descending to destination 115 or ascending from destination 115. Accordingly, embodiments described herein leverage a semantic AGL generated by a neural network analyzing aerial images to improve the accuracy and reliability of perception data.

Figure 2:
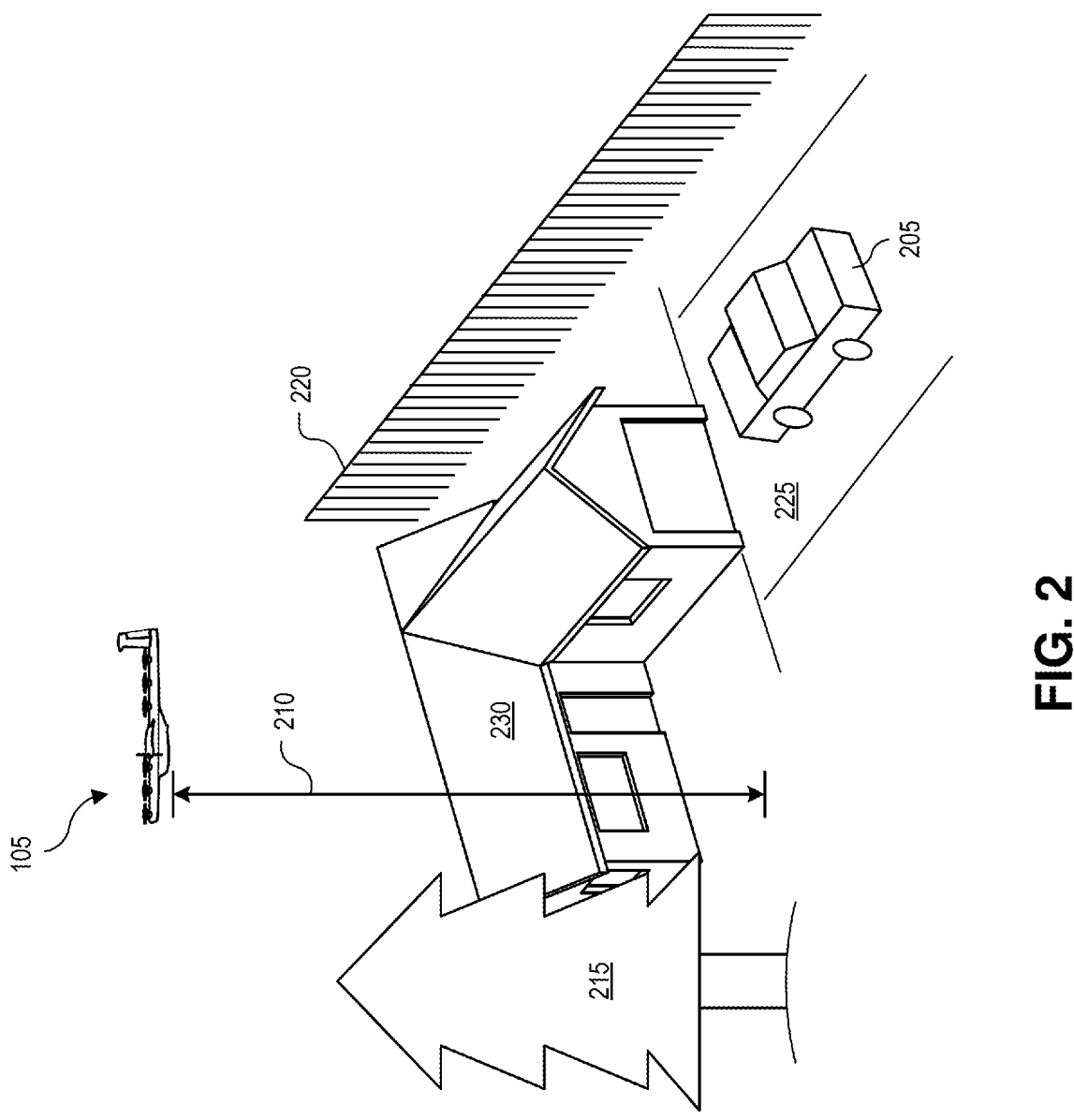
FIG. 2 illustrates how a semantic above ground altitude (AGL) estimate is generated by analyzing an aerial image of a ground area below a UAV, in accordance with an embodiment of the disclosure.

FIG. 2 illustrates how a semantic AGL estimate is generated by analyzing an aerial image of a ground area below UAV 105, in accordance with an embodiment of the disclosure. Onboard machine learning models or neural networks may be used to analyze aerial images acquired from an onboard camera system of UAV 105. The aerial images may be semantically segmented to identify objects in the images. In one embodiment, the aerial images are semantically segmented by a neural network, such as a convolutional neural network (e.g., CNN). Once objects in the image are identified, the size of the objects along with camera intrinsics (e.g., focal length/zoom, resolution, etc.) can be used to estimate the distance to those objects. For example, if car 205 is an identified object in the aerial image and the object's boundaries are delineated, then the dimensions (e.g., width and length in pixels) of the known object along with the camera intrinsics used when capturing the aerial image can be correlated to a distance estimate. For ground-based objects, such as car 205, this distance estimate represents a semantic AGL estimate 210. Of course, the aerial images may be analyzed for a variety of objects to determine a semantic AGL estimate. Example objects may include vehicles (e.g., car 205), picnic tables, mailboxes, trees 215, fences 220, driveways 225, street widths, houses/roofs 230, or any other object that may have a characteristic size or a knowable dimension once identified.

As mentioned, a neural network (e.g., CNN) may be used to analyze the aerial images and automatically generate a semantic AGL estimate. Training of such a neural network may be achieved using mission log data from previous delivery missions (e.g., 1000's of delivery missions) of the UAV delivery service. This mission log data may include aerial images along with GNSS readings, IMU readings, altimeter readings, stereovision depth readings, etc. indexed with the aerial images, which can be fed into a neural network as ground truth data for training the weights and biases of the neural network to output a semantic AGL estimate in response to a future aerial image. The training data may include urban, suburban, or rural datasets as well.

Figure 3:
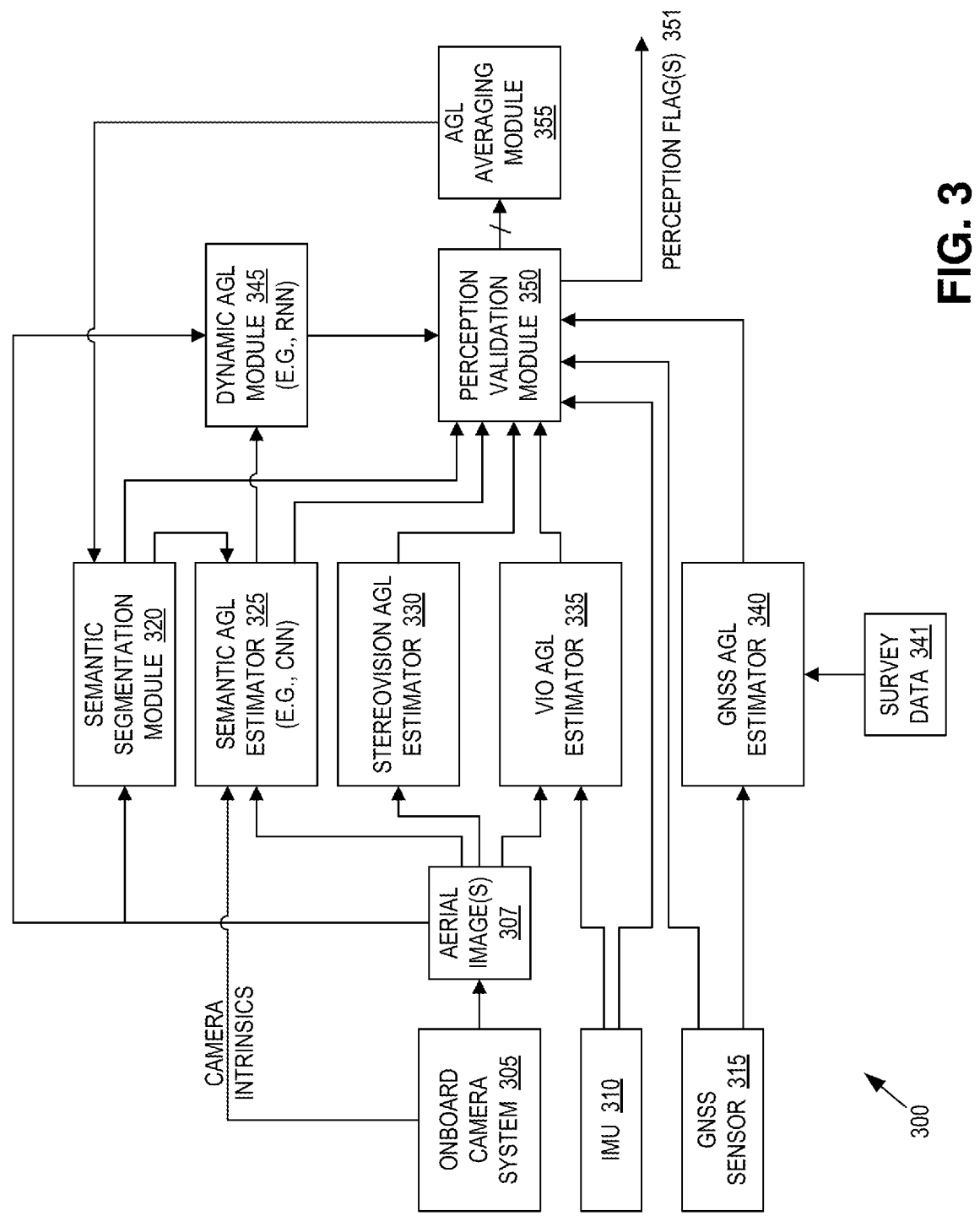
FIG. 3 is a functional block diagram illustrating a perception data system for UAVs, in accordance with an embodiment of the disclosure.

FIG. 3 is a functional block diagram illustrating a perception data system 300 for UAVs 105, in accordance with an embodiment of the disclosure. System 300 represents the relevant software and hardware elements onboard UAVs 105 for implementing the perception validations described herein. The illustrated embodiment of system 300 includes an onboard camera system 305 for acquiring aerial images 307, an IMU 310, a GNSS sensor 315, a semantic segmentation module 320, a semantic AGL estimator 325, a stereovision AGL estimator 330, a VIO AGL estimator 335, a GNSS AGL estimator 340, a dynamic AGL module 345, a perception validation module 350 for generating perception flags 351, and an AGL averaging module 355.

Onboard camera system 305 is disposed on UAVs 105 with a downward looking position to acquire aerial images 307. Aerial images 307 may be acquired at a regular video frame rate (e.g., 20 f/s, 30 f/s, etc.) and a subset of the images provided to the various modules for semantic and AGL analysis. In one embodiment, onboard camera system 305 is a stereovision camera system. While capturing aerial images 307, the camera intrinsics along with sensor readings from various other onboard perception sensors may also be recorded and indexed to aerial images 307. For example, IMU 310 may include one or more of an accelerometer, a gyroscope, or a magnetometer to capture accelerations (linear or rotational), attitude, and heading readings. GNSS sensor 315 may be a global positioning system (GPS) sensor, or otherwise, and output longitude/latitude position, mean sea level (MSL) altitude, heading, etc.

During flight missions, semantic segmentation module 320 is operated as part of the onboard machine vision system and may constantly receive aerial images 307 and identify objects represented in those aerial images. The recognized objects may be tracked and the identifications provided to other modules such as semantic AGL estimator 325, perception validation module 350, or navigation modules (not illustrated) responsible for making real-time flight decisions. To improve object recognition in aerial images 307, semantic segmentation module 320 may receive an AGL estimate so that it sets appropriately sized bounding boxes for object detection and recognition. The AGL estimate may be derived from any of the onboard modules capable of estimating AGL. In one embodiment, AGL averaging module 355 combines all or many of the AGL estimates using an averaging or weighted averaging algorithm to provide the most accurate AGL estimate readily available to semantic segmentation module 320.

In one embodiment, semantic AGL estimator 325 uses object identification (ID) tags received from semantic segmentation module 320 to analyze aerial images 307 to generate a semantic AGL estimate for the current altitude/position of UAV 105. As mentioned, semantic AGL estimator 325 may be implemented using a neural network, such as a CNN that receives the aerial images 307 and object ID tags from semantic segmentation module 320. In other embodiments, semantic segmentation module 320 and semantic AGL estimator 325 may be incorporated into a single deep learning model that outputs both object ID tags and a semantic AGL estimate.

In an embodiment where onboard camera system 305 is a stereovision camera system, stereovision AGL estimator 330 uses the parallax present in the stereovision image streams to generate a stereovision AGL estimate. VIO AGL estimator 335 uses visual-inertial odometry based upon aerial images 307 and IMU 310 to generate another form of AGL estimate referred to as a VIO AGL estimate. VIO is the process of estimating the state (e.g., pose and/or velocity) of a UAV by using aerial images 307 plus outputs from IMU 310. VIO is an alternative to GNSS and lidar-based odometry to achieve accurate state estimation.

GNSS AGL estimator 340 is yet another independent source for estimating AGL. GNSS AGL estimator 340 uses the MSL data along with latitude and longitude data obtained from GNSS sensor 315 to access survey data 341 (e.g., map data) and offset the MSL reading to generate an AGL estimate. Survey data 341 may include surveyed ground altitudes from which the MSL reading may be offset to obtain an AGL estimate.

Some or all of the above AGL estimates may be collectively provided to perception validation module 350. Perception validation module 350 can compare the various AGL estimates (e.g., cross-validate). In particular, the semantic AGL estimate from semantic AGL estimator 325 may be used for validation or cross-validation of the other AGL estimates. In one embodiment, the semantic AGL estimator 325 may even operate as a built-in self-test to validate correct operation of IMU 310 and GNSS sensor 315. AGL estimates that fall within an acceptable deviation may be provided to AGL averaging module 355 by perception validation module 350, which can then combine the AGL estimates to provide a statistically more accurate or robust AGL estimate. AGL averaging module 355 may apply a simple averaging algorithm or a weighted averaging dependent upon which AGL estimates are deemed to be historically more accurate or fall within a statistical grouping with other AGL estimates. In one embodiment, perception validation module 350 may mask or deprecate AGL estimates deemed to be outliers. The masking or deprecating may itself be incorporated into a dynamic weighting applied by AGL averaging module 355. For example, a robust averaging technique with outliers removed may be an iteratively reweighted least squares. Yet another example is a complementary filter technique that combines high-frequency data from one AGL data stream with low-frequency data from another AGL data stream.

The semantic AGL estimate output from semantic AGL estimator 325 may be used to validate more than just AGL. The semantic AGL estimates output from semantic AGL estimator 325 may be tracked and analyzed across time in a stateful manner by dynamic AGL module 345. In this manner, dynamic AGL module 345 can generate UAV motion estimates based upon changes in the semantic AGL estimate. These motion estimates can be used to validate or cross-validate motion data obtained from motion readings (e.g., vertical acceleration, vertical velocity, etc.) output from IMU 310 and GNSS sensor 315. In one embodiment, dynamic AGL module 345 may be implemented as a recurrent neural network (RNN) that receives aerial images 307 and outputs from the CNN of semantic AGL estimator 325. Semantic AGL estimator 325 and/or dynamic AGL module 345 may also be trained to estimate attitude (e.g., pitch, roll, yaw) of UAV 105 based upon aerial images 307. Certain visual static or dynamic characteristics may be apparent in aerial images 307 that are indicative of attitude and motion, as well as altitude. As such a CNN and/or RNN may be trained using past mission log data that includes aerial images indexed with IMU and GNSS data to estimate attitude or motion. Example characteristics include the ratio and position of vertical and horizontal surfaces viewable in a given aerial image. Accordingly, semantic AGL estimator 325 and/or dynamic AGL module 345 may also be trained to cross validate the accelerometer, magnetometer, or other motion/attitude readings obtained from IMU 310 and/or GNSS 315. In addition to estimating altitude based upon the measured pixel size of recognized objects, dynamic AGL module 345 may also be capable of providing a cross-validation signal for the AGL estimates. For example, at higher AGL altitudes, abrupt/rapid changes in AGL estimates should be relatively small and infrequent compared to corresponding changes at lower AGL altitudes. These dynamic changes may be learned and monitored by dynamic AGL module 345.

Figure 4A:
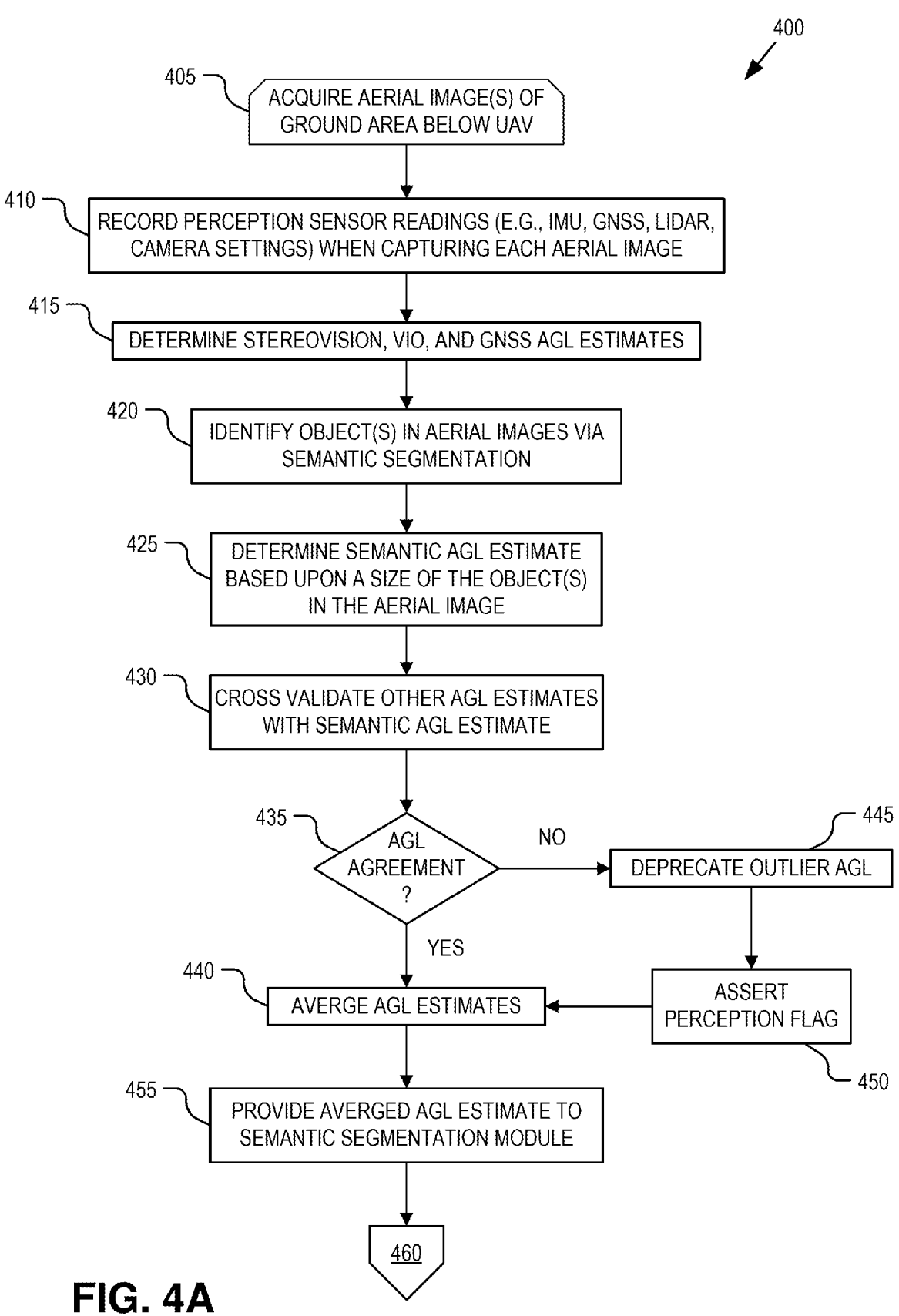
FIGS. 4A & 4B include a flow chart illustrating a process for perception validation of a UAV, in accordance with an embodiment of the disclosure.
Figure 4B:
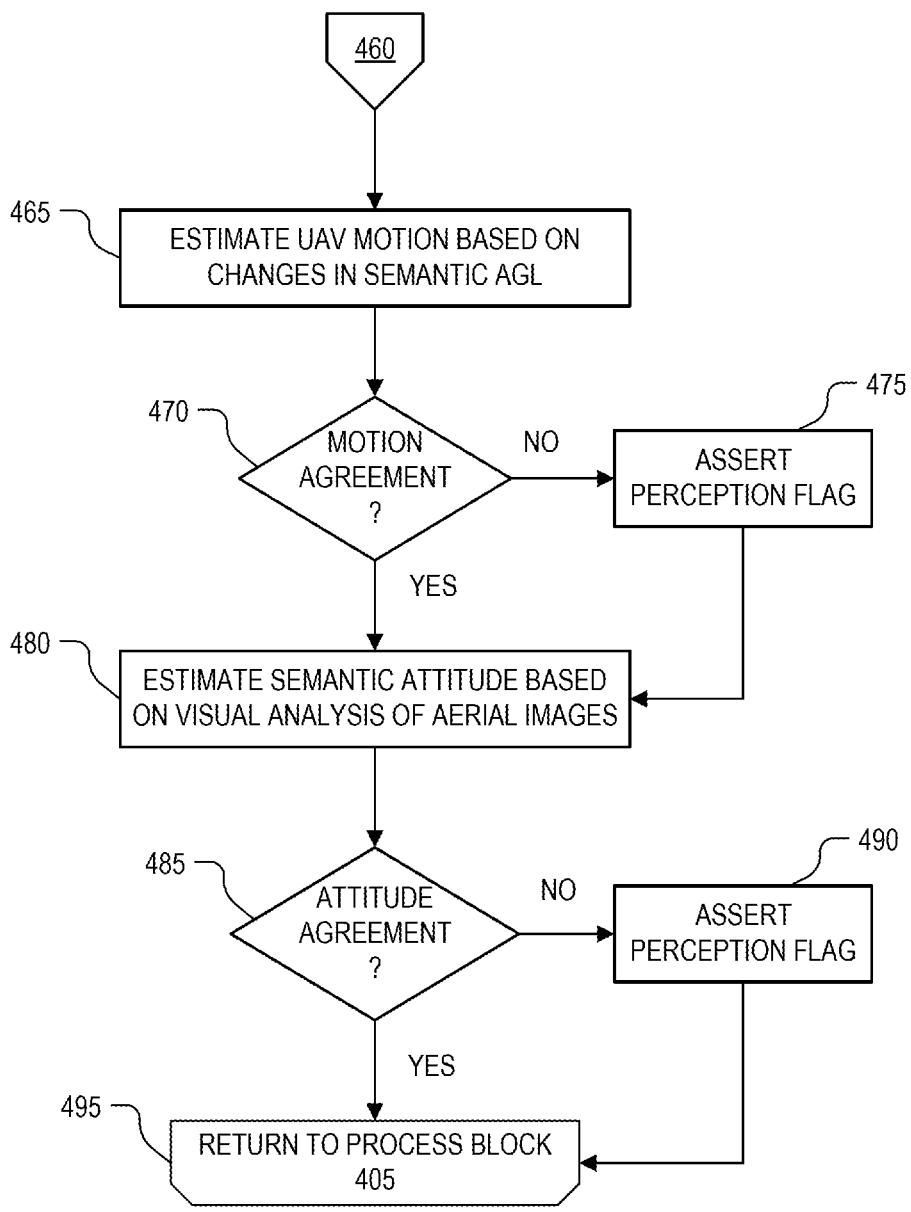

FIGS. 4A & 4B are a flow chart illustrating a process 400 for perception validation of a UAV 105, in accordance with an embodiment of the disclosure. The order in which some or all of the process blocks appear in process 400 should not be deemed limiting. Rather, one of ordinary skill in the art having the benefit of the present disclosure will understand that some of the process blocks may be executed in a variety of orders not illustrated, or even in parallel.

In a process block 405, UAV 105 acquires one or more aerial images 307 of a ground area below UAV 105 with onboard camera system 305. The ground area may be destination area 115 or any other portion of the ground along its route during a flight mission (e.g., UAV delivery mission). In connection with acquiring aerial images 307, UAV 105 also records perception sensor data output from one or more onboard perception sensors and indexes those values to their associated aerial images 307 (process block 410). For example, outputs from IMU 310, GNSS sensor 315, camera settings/intrinsics, and even stereovision depth values output from onboard camera system 305 may be recorded. Other perception sensors may also be included (e.g., lidar sensor, etc.) and those outputs recorded and indexed as well.

In a process block 415, the non-semantic based AGL estimates are generated. For example, stereovision AGL estimator 330 generates a stereovision AGL estimate based upon parallax in the stereovision aerial images 307. In one embodiment, stereovision AGL estimator 330 is incorporated within onboard camera system 305 and is output as an image depth estimate therefrom. Similarly, VIO AGL estimator 335 outputs a VIO AGL estimate based upon image analysis of aerial images 307 along with outputs from IMU 310. GNSS AGL estimator 340 outputs a GNSS AGL estimate based upon the MSL reading from GNSS sensor 315 offset by survey data 341. A position reading from GNSS sensor 315 may be used to index into survey data 341 and select the correct offset value (i.e., ground altitude) from an elevation contour map within survey data 341.

In a process block 420, semantic segmentation module 320 analyzes aerial images 307 to detect and identify objects displayed within aerial images 307. The identified objects may be semantically tagged, located and tracked, and their boundaries defined within a given aerial image 307 by semantic segmentation module 320. This information may be output from semantic segmentation module 320 to semantic AGL estimator 325 as semantic tag information. In a process block 425, semantic AGL estimator 325 analyzes the semantic tag information along with aerial images 307 and the camera intrinsics (e.g., resolution, focal length settings, etc.) to generate a semantic AGL estimate. The semantic AGL estimate may be generated based upon a variety of factors learned by the neural network during training. However, the pixel dimensions of identified objects are expected to be a significant factor when estimating semantic AGL. Of course, in some embodiments, semantic segmentation module 320 and semantic AGL estimator 325 may be merged into a single module or neural network capable of both identifying objects and outputting the semantic AGL estimate.

With the various AGL estimates generated, perception validation module 350 can cross-validate the AGL estimates (process block 430). In particular, the semantic AGL estimate may be compared against the other AGL estimates and by extension used to validate correct operation of the stereovision processing pipeline within stereovision AGL estimator 330 and/or onboard camera system 305, IMU 310, and GNSS sensor 315. If one of the AGL estimates is not in agreement with the other AGL estimates, for example is deemed a statistical outlier (decision block 435), then process 400 continues to a process block 445 where the outlier AGL estimate is masked or otherwise deprecated relative to the other AGL estimates. In the event that one or more AGL estimates are deemed to be an outlier, a perception flag 351 is asserted and recorded into the mission log data (process block 450). In one embodiment, a masked or deprecated AGL estimate is either not referenced, or its averaging weight reduced, when generating an average AGL estimate by AGL averaging module 355. AGL averaging module 355 may reference one or more AGL estimates (e.g., the semantic AGL estimate, the stereovision AGL estimate, the VIO AGL estimate, and the GNSS AGL estimate) when generating its average AGL estimate.

Returning to decision block 435, if two or more or all of the AGL estimates are determined to fall within a threshold level of agreement, then those AGL estimates are combined by AGL averaging module 355 to generate a more accurate and/or reliable AGL estimate (process block 440). AGL averaging module 355 may apply a simple averaging algorithm, a weighted averaging algorithm, or other more sophisticated combination with biases and preferences that accounts for AGL estimates deemed to be more or less reliable. For example, in some scenarios survey data 341 may be known to be unreliable in certain areas and therefore the GNSS AGL estimate may be masked or deprecated with weighting. The averaged AGL estimate may then be provided to other subsystems within UAV 105. For example, the averaged AGL estimate may be provided to semantic segmentation module 320, navigation subsystems, or otherwise (process block 455).

Process 400 continues to FIG. 4B via off page reference 460. Outputs from the neural network (e.g., CNN) of semantic AGL estimator 325 may also be provided to dynamic AGL module 345. In a process block 465, dynamic AGL module 345 monitors changes in the semantic AGL estimate to generate a UAV motion estimate. In one embodiment, the motion estimate is a vertical velocity and/or vertical acceleration estimate. The motion estimate can be compared against readings from an onboard motion sensor, such as IMU 310 or GNSS sensor 315, to validate correct operation of the motion sensor. If the motion estimate from dynamic AGL module 345 and the motion sensor don't agree or fail to validate (decision block 470), then a perception flag 351 is asserted in a process block 475. If the motion estimate and the motion sensor do agree within a threshold value (decision block 470), then process 400 continues to a process block 480.

In process block 480, semantic AGL estimator 325, dynamic AGL module 345 and/or perception validation module 350 may further analyze aerial images 307 to generate an attitude estimate. As discussed above a neural network (e.g., CNN or RNN) may be further trained on mission log data to extract yaw, pitch, or roll estimates from aerial images 307. The neural network used for estimating attitude may be distinct from semantic AGL estimator 325 or dynamic AGL module 345 or may be merged with one or both of these modules. If the attitude estimate agrees with sensor readings from IMU 310 (decision block 485), then process 400 repeats from process block 495. If the attitude estimate fails to agree with the attitude estimate within a threshold value, then a perception flag 351 is asserted by perception validation module 350 to flag the mismatch at a process block 490 and process 400 again repeats.

Figure 5A:
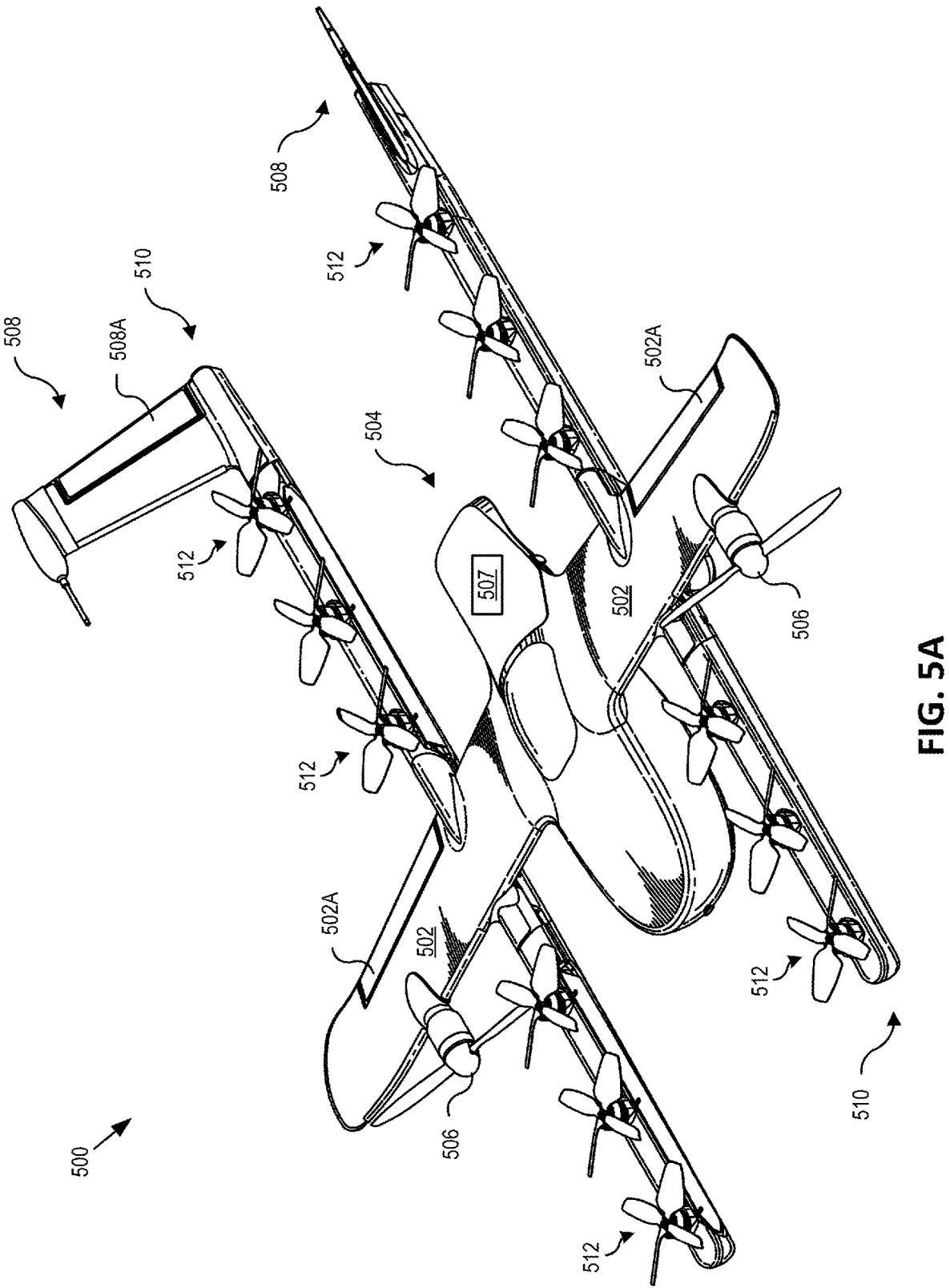
FIG. 5A is a perspective view illustration of a UAV configured for use in a UAV delivery system, in accordance with an embodiment of the disclosure.
Figure 5B:
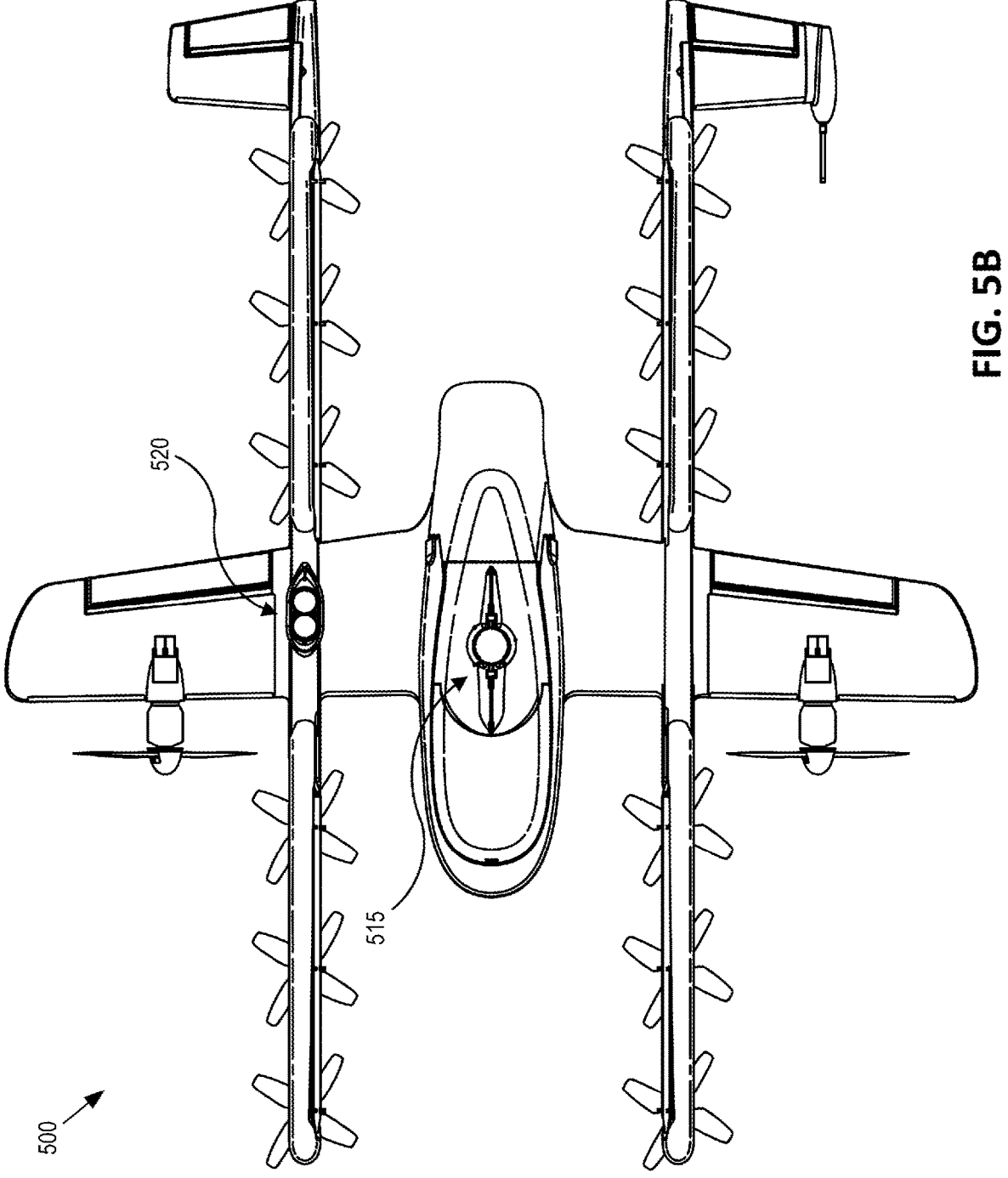
FIG. 5B is an underside plan view illustration of the UAV configured for use in the UAV delivery system, in accordance with an embodiment of the disclosure.

FIGS. 5A and 5B illustrate a UAV 500 that is well suited for delivery of packages, in accordance with an embodiment of the disclosure. FIG. 5A is a topside perspective view illustration of UAV 500 while FIG. 5B is a bottom side plan view illustration of the same. UAV 500 is one possible implementation of UAVs 105 illustrated in FIG. 1, although other types of UAVs may be implemented as well.

The illustrated embodiment of UAV 500 is a vertical takeoff and landing (VTOL) UAV that includes separate propulsion units 506 and 512 for providing horizontal and vertical propulsion, respectively. UAV 500 is a fixed-wing aerial vehicle, which as the name implies, has a wing assembly 502 that can generate lift based on the wing shape and the vehicle's forward airspeed when propelled horizontally by propulsion units 506. The illustrated embodiment of UAV 500 has an airframe that includes a fuselage 504 and wing assembly 502. In one embodiment, fuselage 504 is modular and includes a battery module, an avionics module, and a mission payload module. These modules are secured together to form the fuselage or main body.

The battery module (e.g., fore portion of fuselage 504) includes a cavity for housing one or more batteries for powering UAV 500. The avionics module (e.g., aft portion of fuselage 504) houses flight control circuitry of UAV 500, which may include a processor and memory, communication electronics and antennas (e.g., cellular transceiver, wifi transceiver, etc.), and various sensors (e.g., global positioning sensor, an inertial measurement unit, a magnetic compass, a radio frequency identifier reader, etc.). Collectively, these functional electronic subsystems for controlling UAV 500, communicating, and sensing the environment may be referred to as a control system 507. Control system 507 may incorporate the function components of system 300 described in connection with FIG. 3. The mission payload module (e.g., middle portion of fuselage 504) houses equipment associated with a mission of UAV 500. For example, the mission payload module may include a payload actuator 515 (see FIG. 2B) for holding and releasing an externally attached payload (e.g., package for delivery). In some embodiments, the mission payload module may include camera/sensor equipment (e.g., camera, lenses, radar, lidar, pollution monitoring sensors, weather monitoring sensors, scanners, etc.). In FIG. 2B, an onboard camera 520 is mounted to the underside of UAV 500 to support a computer vision system (e.g., stereoscopic machine vision) for visual triangulation and navigation as well as operate as an optical code scanner for reading visual codes affixed to packages. These visual codes may be associated with or otherwise match to delivery missions and provide the UAV with a handle for accessing destination, delivery, and package validation information. Of course, onboard camera 520 may alternatively be integrated within fuselage 504.

As illustrated, UAV 500 includes horizontal propulsion units 506 positioned on wing assembly 502 for propelling UAV 500 horizontally. UAV 500 further includes two boom assemblies 510 that secure to wing assembly 502. Vertical propulsion units 512 are mounted to boom assemblies 510. Vertical propulsion units 512 providing vertical propulsion. Vertical propulsion units 512 may be used during a hover mode where UAV 500 is descending (e.g., to a delivery location), ascending (e.g., at initial launch or following a delivery), or maintaining a constant altitude. Stabilizers 508 (or tails) may be included with UAV 500 to control pitch and stabilize the aerial vehicle's yaw (left or right turns) during cruise. In some embodiments, during cruise mode vertical propulsion units 512 are disabled or powered low and during hover mode horizontal propulsion units 506 are disabled or powered low.

During flight, UAV 500 may control the direction and/or speed of its movement by controlling its pitch, roll, yaw, and/or altitude. Thrust from horizontal propulsion units 506 is used to control air speed. For example, the stabilizers 508 may include one or more rudders 508*a* for controlling the aerial vehicle's yaw, and wing assembly 502 may include elevators for controlling the aerial vehicle's pitch and/or ailerons 502*a* for controlling the aerial vehicle's roll. While the techniques described herein are particularly well-suited for VTOLs providing an aerial delivery service, it should be appreciated that analyzing shadow lengths to infer the heights of ground-based obstacles is applicable to a variety of aircraft types (not limited to VTOLs) providing a variety of services or serving a variety of functions beyond package deliveries.

Many variations on the illustrated fixed-wing aerial vehicle are possible. For instance, aerial vehicles with more wings (e.g., an "x-wing" configuration with four wings), are also possible. Although FIGS. 5A and 5B illustrate one wing assembly 502, two boom assemblies 510, two horizontal propulsion units 506, and six vertical propulsion units 512 per boom assembly 510, it should be appreciated that other variants of UAV 500 may be implemented with more or less of these components.

It should be understood that references herein to an "unmanned" aerial vehicle or UAV can apply equally to autonomous and semi-autonomous aerial vehicles. In a fully autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator may control high level navigation decisions for a UAV, such as specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method for perception validation of an unmanned aerial vehicle (UAV), the method comprising:
   acquiring an aerial image of a ground area with an onboard camera system of the UAV;
   generating a semantic above ground altitude (AGL) estimate with a neural network trained to output the semantic AGL estimate in response to the aerial image fed as an input to the neural network;
   generating a motion estimate or a position estimate based upon perception sensor data output from a perception sensor disposed onboard the UAV; and
   cross-validating the motion or position estimate against the semantic AGL estimate.

2. The method of claim 1, further comprising:
   asserting a perception flag when the cross-validating indicates the motion or position estimate is inconsistent with the semantic AGL estimate.

3. The method of claim 1, wherein the perception sensor comprises a global navigation satellite system (GNSS) sensor and the motion or position estimate comprises a GNSS-based AGL estimate.

4. The method of claim 1, wherein the motion or position estimate comprises at least one of a stereovision AGL estimate or a visual-inertial odometry (VIO) estimate.

5. The method of claim 1, further comprising:
   generating a plurality of secondary AGL estimates based upon perception sensor data output from a plurality of different perception sensors; and
   cross-validating the secondary and semantic AGL estimates.

6. The method of claim 5, further comprising:
   deprecating or masking one of the secondary or semantic AGL estimates if the one of the secondary or semantic AGL estimates is deemed an outlier compared to others of the secondary or semantic AGL estimates.

7. The method of claim 5, further comprising:
   combining one or more of the secondary AGL estimates with the semantic AGL estimate to generate an average AGL estimate; and
   providing the average AGL estimate to a semantic segmentation module to improve object recognition used to navigate the UAV.

8. The method of claim 1, wherein the perception sensor comprises a motion sensor, the method further comprising:

generating UAV motion estimates based on changes in the semantic AGL estimate; and validating operation of the motion sensor against the UAV motion estimates.

9. The method of claim 8, wherein the UAV motion estimates comprise UAV vertical velocity or vertical acceleration estimates and the perception sensor comprises a global navigation satellite system (GNSS) sensor or an inertial measurement unit (IMU) sensor.

10. The method of claim 1, further comprising:

analyzing one or more additional aerial images with the neural network to generate an attitude estimate of the UAV; and validating operation of an inertial measurement unit (IMU) against the attitude estimate.

11. The method of claim 1, wherein the neural network comprises a convolutional neural network (CNN) trained on mission log data acquired from a plurality of UAV delivery mission logs.

12. The method of claim 11, further comprising:

analyzing an output of the CNN with a recurrent neural network (RNN) to generate UAV motion estimates.

13. At least one non-transitory computer-readable medium having logic stored thereon that, in response to execution by one or more processors of an unmanned aerial vehicle (UAV), cause the UAV to perform operations comprising:

acquiring an aerial image of a ground area with an onboard camera system of the UAV;

generating a semantic above ground altitude (AGL) estimate with a neural network trained to output the semantic AGL estimate in response to the aerial image fed as an input to the neural network;

generating a motion estimate or a position estimate based upon perception sensor data output from a perception sensor disposed onboard the UAV; and cross-validating the motion or position estimate against the semantic AGL estimate.

14. The at least one non-transitory computer-readable medium of claim 13, the operations further comprising:

asserting a perception flag when the cross-validating indicates the motion or position estimate is inconsistent with the semantic AGL estimate.

15. The at least one non-transitory computer-readable medium of claim 13, wherein the perception sensor comprises a global navigation satellite system (GNSS) sensor and the motion or position estimate comprises a GNSS-based AGL estimate.

16. The at least one non-transitory computer-readable medium of claim 13, wherein the motion or position estimate comprises at least one of a stereovision AGL estimate or a visual-inertial odometry (VIO) estimate.

17. The at least one non-transitory computer-readable medium of claim 13, the operations further comprising:

generating a plurality of secondary AGL estimates based upon perception sensor data output from a plurality of different perception sensors; and cross-validating the secondary and semantic AGL estimates.

18. The at least one non-transitory computer-readable medium of claim 17, the operations further comprising:

deprecating or masking one of the secondary or semantic AGL estimates if the one of the secondary or semantic AGL estimates is deemed an outlier compared to others of the secondary or semantic AGL estimates.

19. The at least one non-transitory computer-readable medium of claim 17, the operations further comprising:

combining one or more of the secondary AGL estimates with the semantic AGL estimate to generate an average AGL estimate; and providing the average AGL estimate to a semantic segmentation module to improve object recognition used to navigate the UAV.

20. The at least one non-transitory computer-readable medium of claim 13, wherein the perception sensor comprises a motion sensor, the method further comprising:

generating UAV motion estimates based on changes in the semantic AGL estimate; and validating operation of the motion sensor against the UAV motion estimates.

21. The at least one non-transitory computer-readable medium of claim 13, the operations further comprising:

analyzing one or more additional aerial images with the neural network to generate an attitude estimate of the UAV; and validating operation of an inertial measurement unit (IMU) against the attitude estimate.

22. The at least one non-transitory computer-readable medium of claim 13, wherein the neural network comprises a convolutional neural network (CNN) trained on mission log data acquired from a plurality of UAV delivery mission logs.

23. The method of claim 1, wherein generating the semantic AGL estimate comprises generating the semantic AGL estimate based on the aerial image and without reference to global navigation satellite system (GNSS) sensor data.

\* \* \* \* \*